(12) United States Patent
Tu et al.

(10) Patent No.: US 8,164,819 B2
(45) Date of Patent: Apr. 24, 2012

(54) PHOTONIC TECHNIQUE FOR GENERATING ARBITRARY WAVEFORMS

(75) Inventors: Kun-Yii Tu, Califon, NJ (US);
Ting-Chen Hu, Edison, NJ (US);
Young-Kai Chen, Berkeley Heights, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/776,570

(22) Filed: May 10, 2010

(65) Prior Publication Data

US 2011/0149370 A1  Jun. 23, 2011

Related U.S. Application Data

(63) Continuation-in-part of application No. 12/641,601, filed on Dec. 18, 2009.

(51) Int. Cl.
*G02F 1/01* (2006.01)

(52) U.S. Cl. ........................ 359/279; 359/276

(58) Field of Classification Search .......... 359/276, 359/279
See application file for complete search history.

(56) References Cited

U.S. PATENT DOCUMENTS

| 6,377,717 | B1 * | 4/2002 | Kimber et al. ............ 385/2 |
| 7,657,190 | B2 * | 2/2010 | Akiyama ................ 398/195 |
| 7,894,696 | B2 * | 2/2011 | Baehr-Jones et al. ...... 385/122 |
| 2009/0074425 | A1 * | 3/2009 | Tanaka et al. ............ 398/185 |

* cited by examiner

*Primary Examiner* — William Choi
(74) *Attorney, Agent, or Firm* — C. Bilicska

(57) ABSTRACT

In a radio frequency (RF)-photonic arbitrary waveform generator (AWG), an optical carrier signal is phase-modulated using an arbitrary waveform optical phase generator (AWPOG), which may include, e.g., sequential optical phase modulators. The phase-modulated optical signal is combined with a version of the optical carrier signal to yield an optical waveform, whose amplitude varies with a phase shift introduced by the AWPOG to the optical carrier signal. By manipulating electrical inputs to the AWPOG which control the phase shift, the optical waveform can be arbitrary shaped. The optical waveform may then be converted to an electrical waveform having a radio frequency.

8 Claims, 4 Drawing Sheets

100

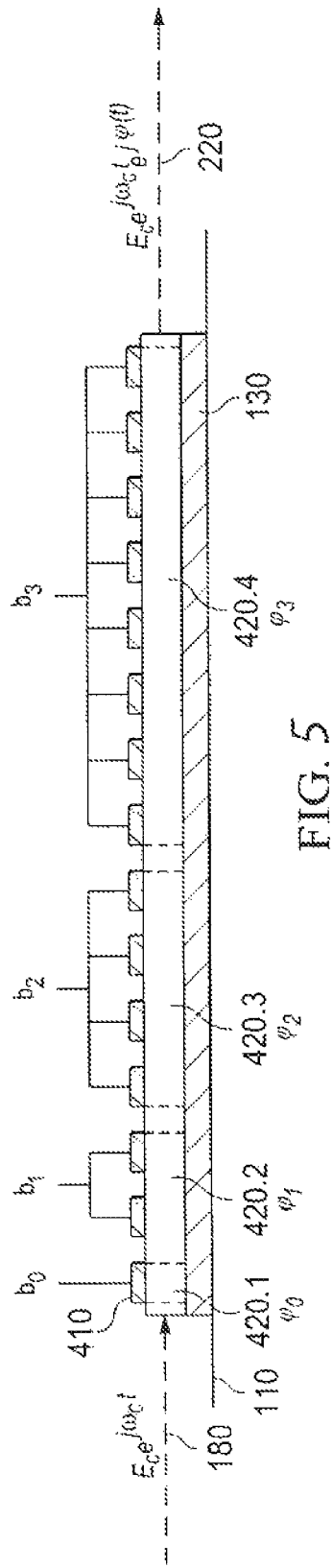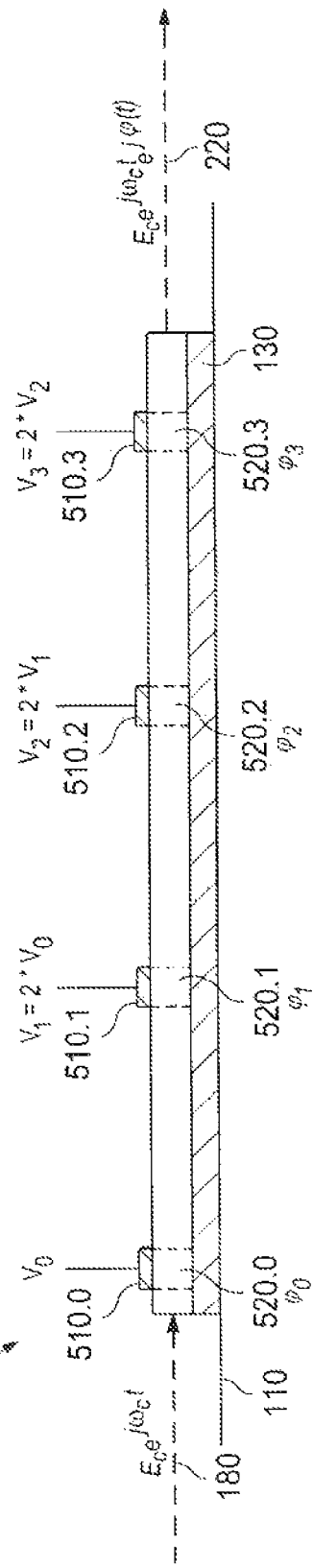

PHOTONIC TECHNIQUE FOR GENERATING ARBITRARY WAVEFORMS

CROSS-REFERENCE TO RELATED APPLICATIONS

This application is a continuation-in-part of U.S. patent application Ser. No. 12/641,601, filed on Dec. 18, 2009, which is incorporated herein by reference in its entirety.

FIELD OF THE INVENTION

The invention relates to a signal generation technique and, more particularly, to a technique for generating arbitrary waveforms using photonics.

BACKGROUND OF THE INVENTION

This section introduces aspects that may help facilitate a better understanding of the invention. Accordingly, the statements of this section are to be read in this light and are not to be understood as admissions about what is prior art or what is not prior art.

An arbitrary waveform generator (AWG) is needed in many communication applications, for example, in radar systems, and is a particularly useful tool for designing and testing equipment and circuits in simulated conditions. As the speed of communication increases, the bandwidth of arbitrary waveforms required of an AWG increases. As a result, electronic AWGs are no longer effective in some high-speed applications. Radio frequency (RF)-photonic AWGs have been developed to meet the increasing bandwidth requirement, which currently can afford about 10 GHz to 20 GHz bandwidth. For example, a common RF-photonic AWG is designed with parallel optical amplitude-switching modulators.

BRIEF SUMMARY

The dynamic range of the AWG designed with parallel amplitude-switching modulators is undesirably limited due to a low extinction ratio of the amplitude modulators therein. This limitation stems from the fact that in one such AWG, the signal from an amplitude modulator corresponding to the least significant channel would be too weak to be differentiable from the leakage of the stronger signal from another amplitude modulator corresponding to the most significant channel. An embodiment of the invention overcomes such a dynamic range limitation by designing an AWG with a phase-modulation device including, e.g., sequential optical phase modulators, instead. Thus, in accordance with one embodiment of the invention, a phase-modulation device is used to phase-modulate a first optical carrier signal having a given phase, resulting in a phase-modulated optical signal whose phase differs from the given phase by a phase value which is controllable by one or more inputs to the device. A second optical carrier signal having the given phase is combined with the phase-modulated optical signal to provide a waveform whose amplitude varies with the phase value. Thus, by manipulating the inputs as a function of time, one can control the phase value to arbitrarily shape the waveform.

BRIEF DESCRIPTION OF THE DRAWINGS

FIG. 5 illustrates an AWOPG in a third embodiment; and

FIG. 6 illustrates AWOPG in a fourth embodiment.

DETAILED DESCRIPTION

Figure 1:
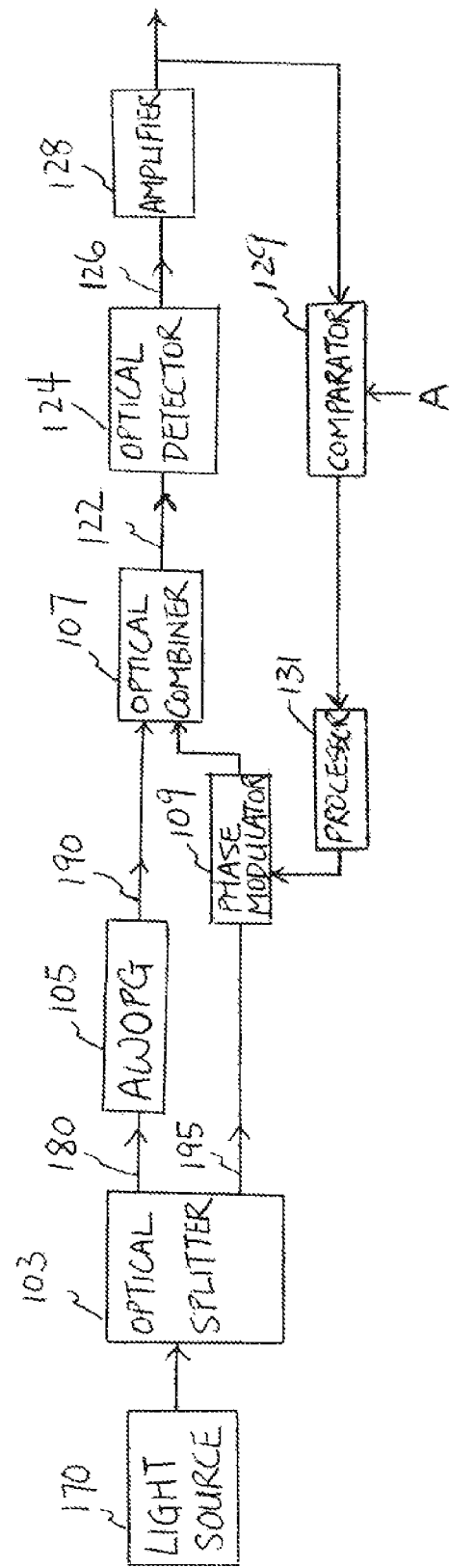
FIG. 1 is a schematic diagram of an arbitrary wave generator (AWG) according to one embodiment of the invention.

FIG. 1 illustrates a radio frequency (RF)-photonic arbitrary wave generator (AWG) 100 embodying the principles of the invention. In one embodiment, AWG 100 is realized using arbitrary waveform optical phase generator (AWOPG) 105, which is different from a common AWG designed with parallel amplitude-switching-modulators. The latter has a lesser dynamic range, stemming from the fact that the signal from its amplitude modulator corresponding to the least significant channel would be too weak to be differentiable from the leakage of the stronger signal from its other amplitude modulator corresponding to the most significant channel.

As illustrated in FIG. 1, light source 170 in AWG 100 may be, e.g., a visible or invisible coherent optical source such as a laser diode. It provides an optical carrier, which is split by optical splitter 103 to form two identical optical carrier signals, denoted 180 and 195, respectively. By way of example, optical carrier signal 180, which is fed to AWOPG 105, is in the form $E_c e^{j\omega_c t}$, having a nearly constant magnitude $E_c$ and a carrier frequency $\omega_c$.

Figure 2:
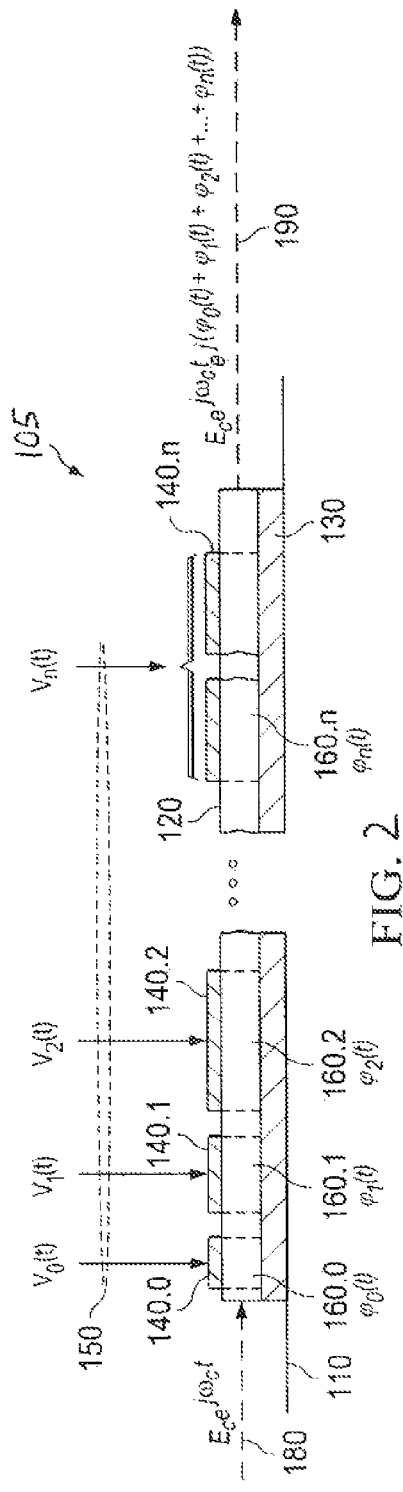
FIG. 2 illustrates an arbitrary waveform optical phase generator (AWOPG) in one embodiment, used in the AWG of FIG. 1.

In one embodiment, AWOPG 105 employs sequential optical phase modulators to modulate signal 180 with digital inputs so as to controllably adjust its phase. FIG. 2 illustrates a generalized embodiment of AWOPG 105. The latter is illustrated without limitation as a planar optical waveguide device formed on a substrate 110. Embodiments utilizing other forms of optical waveguide, such as fiber waveguide, are within the capability of those skilled in the optical arts given the present disclosure. An optical path 120 is formed over the substrate 110, with an electrode 130 located therebetween. Electrodes 140.0, 140.1, 140.2 ... 140.n, collectively referred to herein as electrodes 140, are located over optical path 120. The electrodes are energized by control signals $V_0(t)$, $V_1(t)$, $V_2(t)$, ... $V_n(t)$, collectively referred to as control signals 150. Each of the substrate 110, optical path 120, electrode 130 and electrodes 140 may be conventional or formed by any future-discovered process. The optical path may include, e.g., lithium niobate ($LiNbO_3$), silicon (Si), Indium phosphide (InP) or other electro-optic material capable of inducing a phase shift on an optical signal passing therethrough in response to a voltage between one or more of the electrodes 140 and the electrode 130.

Each electrode 140 is associated with a corresponding phase modulation section 160. Thus, for example, the electrode 140.0 is associated with a phase modulation section 160.0, the electrode 140.1 is associated with a phase modulation section 160.1, and so on. Each electrode 140 is also associated with a corresponding incremental phase shift, $\phi_n(t)$. Thus, the electrode 140.0 is associated with a phase shift $\phi_n(t)$, the electrode 140.1 is associated with a phase shift $\phi_1(t)$, and so on. The phase shifts are generally a function of time, reflecting the modulation thereof by the corresponding electrode 140. Hereinafter the time dependence of the phase shift $\phi_n$ is omitted, while it is understood that each phase shift $\phi_n$ is generally a function of time.

In various embodiments the phase shifts $\phi_0, \phi_1, \phi_2, \ldots \phi_n$ are discrete phase shifts. The phase shifts are discrete in the sense that each electrode 140 is configurable to produce the phase shift $\phi_n$ associated therewith independently of a phase shift produced by another electrode 140. In various embodiments, the magnitudes of the phase shifts are also different, meaning that no two phase shifts $\phi_0$, $\delta\phi_1$, $\delta\phi_2 \ldots \delta\phi_n$ are equal. As described further below, the phase of the input optical carrier signal 180 is shifted by a total phase shift that is a sum of the discrete phase shifts to produce the resulting phase-modulated optical signal 190.

Without limitation by theory, in general when a voltage is applied between an electrode 140 and the electrode 130, the index of refraction of the phase modulation section 160 associated with that electrode 140 will change, thus changing the optical path length of that phase modulation section 160. The change of optical path length is expected to cause a corresponding change of the phase of the input optical carrier signal 180 passing through the phase modulation section 160. The input optical carrier signal 180 experiences an incremental phase shift associated with each energized electrode 140.

The phase shift produced on the optical carrier signal 180 may be expressed generally as $e^{j\Phi(t)}$, and is about the sum of the incremental phase shifts produced by each of the phase modulation sections 160. If control signals 150, e.g. $V_0(t)$, $V_1(t)$, $V_2(t) \ldots V_n(t)$, vary with time, then $e^{j\Phi(t)}$ will also be time-dependent. For notational convenience the control signals 150 may be designated $b_0$, $b_1$, $b_2$, ... $b_n$. In some embodiments the control signals 150 represent digital inputs, e.g., binary inputs. A binary input has two states where a first state, corresponding to a logical "0" or Boolean "false", may correspond to control of the associated modulation section 160 such that no phase shift occurs therein. A second state, corresponding to a logical "1" or Boolean "true," may correspond to control of the associated modulation section 160 such that a predetermined nonzero phase shift occurs therein. Of course, the assignment of logical states to voltage states of the electrodes 140 is arbitrary, and may be reversed. A total phase shift imposed by the APWG 100 on the input optical signal 180 may be represented as $e^{jb_0\phi_0}e^{jb_1\phi_1}e^{jb_2\phi_2}\ldots e^{jb_n\phi_n}$ — $e^{j(b_0\phi_0+b_1\phi_1+b_2\phi_2+\ldots+b_n\phi_n)}$, where $\phi_0$, $\phi_1$, $\phi_2$, ... $\phi_n$ are the respective incremental phase shifts produced by the bits $b_0$, $b_1$, $b_2$, ... $b_n$, and $b_0\phi_0+b_1\phi_1+b_2\phi_2+\ldots+b_n\phi_n$ is a total phase shift due to the modulation sections 160 associated with the active electrodes 140.

Various embodiments presented herein may describe the electrodes 140 as having a particular relationship of lengths relative to one another. AWOPG 105, for instance, is shown with the electrode 140.2 being longer than the electrode 140.1, the electrode 140.3 being longer than the electrode 140.2, and so on, with the electrode 140.n being the longest electrode. While the electrodes 140 are illustrated as increasing in length monotonically in the direction of signal propagation, other configurations are possible and contemplated, including the electrodes 140 being ordered such that they become smaller in the direction of propagation, or even the electrode lengths being unordered. The order of the electrodes 140 in the direction of signal propagation is expected to be unimportant to the operation of the AWOPG 105.

In an embodiment, the lengths of the electrodes 140 increase in a logarithmic fashion, such that, for example, a ratio of the length of the electrode 140.2 to the length of the electrode 140.1 is about the same as the ratio of the electrode 140.3 to the electrode 140.2. More specifically, in the illustrated embodiment of the AWOPG 105, the ratio of the length of the electrode 140.2 to that of the electrode 140.1 is about 2, the ratio of the length of the electrode 140.3 to that of the electrode 140.2 is about 2, and so on. This embodiment is referred to herein as a binary electrode sequence.

When the electrodes 140 are configured with the binary electrode sequence illustrated for the AWOPG 105, a phase shift produced by an electrode 140, e.g., the electrode 140.2, relative to a next smaller electrode 140, e.g., the electrode 140.1, also has a ratio of about 2 when $|V_2(t)| \approx |V_1(t)|$. Thus, the ratio of the phase shift produced by each modulation section 160, e.g., the modulation section 160.2, to the phase shift produced by the next shorter modulator section, e.g. the modulation section 160.1, is about 2 when the electrodes are driven digitally.

While the AWOPG 105 is illustrated having a binary electrode sequence, other electrode configurations are within the scope of the disclosure. For example, the electrodes 140 may have a logarithmic progression other than binary, e.g., any desired ratio that is consistent with device material and processing constraints. In some cases the length of the electrodes 140, and the accompanying phase shift produced thereby, may differ by a relationship other than a logarithmic relationship. In some embodiments, e.g., the length of the electrodes 140 may increase linearly. In other embodiments, the electrodes 140 have a length such that only a single electrode 140 need be energized to produce each desired phase shift value. The length of electrodes may be adjusted, e.g., by laser trimming, when precision of the phase-shift ratio is desired.

Figure 3:
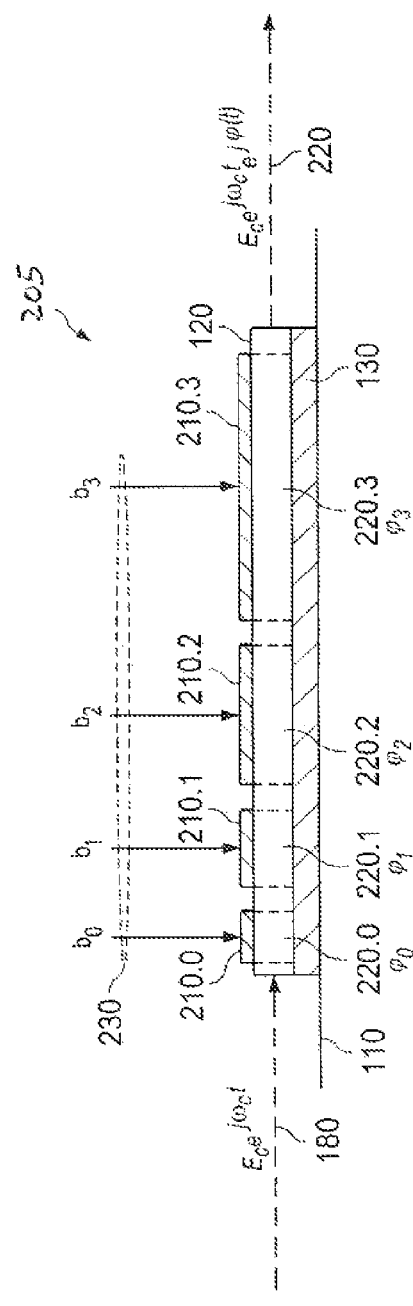
FIG. 3 illustrates an AWOPG in a second embodiment.

FIG. 3 illustrates a particular embodiment of an AWOPG 105, which is denoted 205, and which has four electrodes 210.1, 210.2, 210.3, 210.4, referred to collectively as electrodes 210. The electrodes 210 are configured to control the phase of the input optical carrier signal 180 through the optical path 120 to produce a phase modulated optical signal 220. The electrodes 210 are controlled by four respective control signals 230. In the illustrated embodiment, the control signals 230 are taken to be binary control lines, and the electrodes 210 are configured in a binary electrode sequence. In the discussion of the AWOPG, the control lines 230 may be referred to collectively as B and individually as $b_0$, $b_1$, $b_2$, $b_3$ to reflect their status in various embodiments as bits of a control word configured to set $e^{j\Phi(t)}$ to a desired value.

In various embodiments AWOPG 105 is configured to produce a total phase shift $\phi_T$ less than $2\pi$. For example, if the control lines 230 ($b_0$, $b_1$, $b_2$, and $b_3$) are each configured to have two states then the AWOPG 205 may provide $2^4=16$ unique phase shifts. The phase delay provided by the AWOPG 205 may be expressed as $$e^{\frac{\pi}{8}B},$$

in some cases ranging from about 0 radians to about $$\frac{15}{8}\pi.$$

Those skilled in the pertinent art will appreciate the principle illustrated by FIG. 2 may be extended to greater or fewer than four control lines. In some embodiments, the control signals 150 of the AWOPG 105 include at least six control lines. In principle the number of bits can be extended to an arbitrarily high number within overall design constraints such as device size and complexity. In general, a greater number of control bits results in a greater precision of the total phase shift produced on the input optical signal 180.

Figure 4:
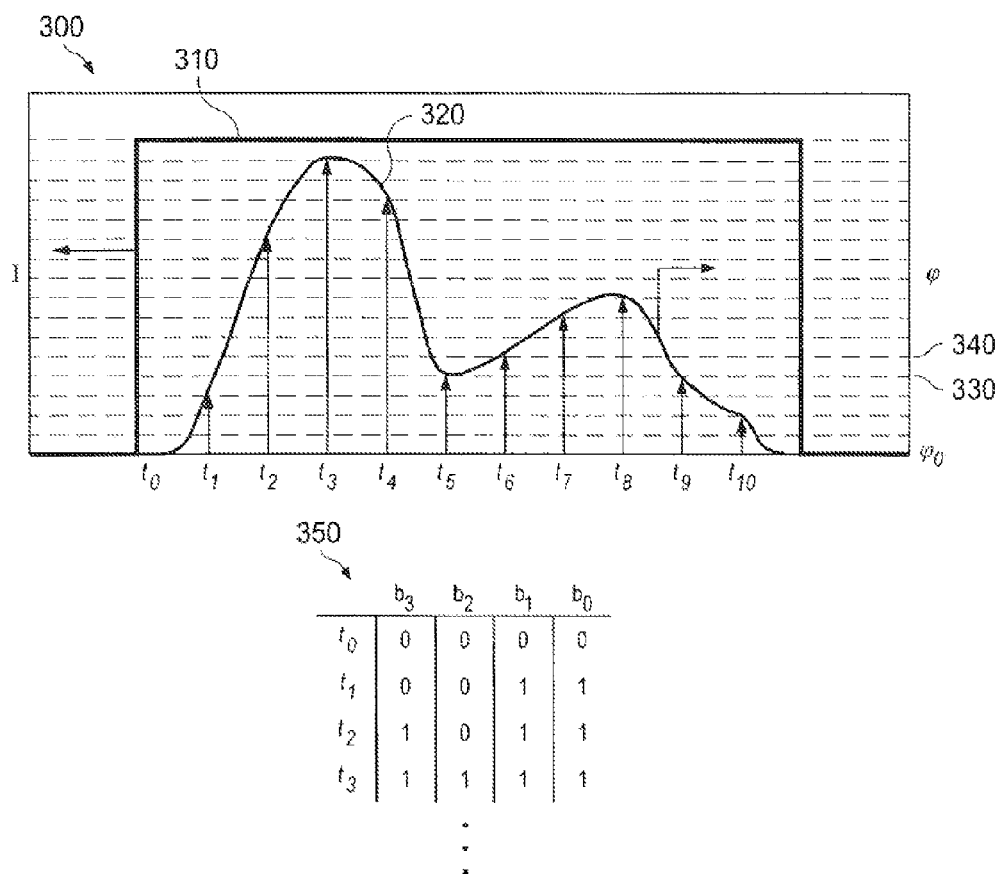
FIG. 4 illustrates an example magnitude and phase of a signal produced by an AWOPG.

FIG. 4 illustrates an example phase/magnitude characteristic of a temporal phase shift pattern 300, sometimes referred to herein for brevity as a pattern 300. The pattern 300 is described by a magnitude characteristic 310 and a phase characteristic 320. The magnitude characteristic 310 is illustrated for the case of an optional embodiment in which the light source 170 is pulsed. In various alternate embodiments the light source 170 is CW (continuous wave), at least with respect to an interval between two patterns 300. The phase characteristic 320 is illustrated for the case of the output optical signal 220, e.g., the case that the input optical signal 180 is modulated by a set of four unique phase shift quanta. A phase shift quantum is a difference between two adjacent phase shift values, for example, between a phase shift value 330 and a phase shift value 340. The phase characteristic 320 is illustrated for the nonlimiting case that the output optical signal 220 initially has a baseline phase $\phi_o$, which in general is arbitrary with respect to the phase of the input optical signal 180.

Bit combinations of the control signals 230, e.g., corresponding to the illustrated states of the phase characteristic 320, are shown in a table 350 for the first three phase states corresponding to times $t_1$, $t_2$, $t_3$. At time $t_1$, the phase of the output optical signal 220 is about $$\varphi_o + \frac{3}{8}\pi.$$

At time $t_2$, the phase of the output optical signal 220 is about $$\varphi_o + \frac{11}{8}\pi.$$

At time $t_3$, the phase of the output optical signal 220 is about $$\varphi_o + \frac{15}{8}\pi.$$

The pattern 300 is illustrated having ten phase states associated therewith, though in principle the pattern 300 may have an arbitrarily large number of associated phase states.

It is noted that the AWOPG 105 may be configured to result in any desired baseline phase $\phi_o$ of the output optical signal 190. For instance, the length of various optical paths may be controlled to result in a particular value of $\phi_o$. The particular $\phi_o$ may be related, e.g., to requirements of a receiving device. Also, in some embodiments the control of the AWOPG 105 is biased to produce a desired phase range about the baseline phase. For example, the control signals 150 may be biased to produce about a±π phase shift about the baseline phase, which may be desirable in various embodiments, such as AWGs.

It is expected that each phase modulation section 160 of the AWOPG 105 may be driven at a frequency of greater than 20 Gbits/s. In some embodiments each modulation section 160 may be driven at a frequency of 50 Gbits/s or greater.

Various alternate embodiments may be used to produce optical path portions having unique optical path lengths. FIG. 5 illustrates one alternate embodiment generally designated 405 in which bits $b_0$, $b_1$, $b_2$, $b_3$ are each coupled to one or more electrodes 410 to result in four phase modulation sections 420.0, 420.1, 420.2, 420.3 having a binary sequence of path lengths. The electrodes 410 are nominally identical in the illustrated embodiment. Thus, when the bits $b_1$ and $b_0$ provide about a same voltage to their respective electrodes, the bit $b_1$, which applies a control voltage to two electrodes 410, produces a phase shift on the input optical signal 180 about twice that of bit $b_0$, which controls the voltage of only a single electrode 410. Similarly, the bit $b_2$ controls the voltage of four electrodes 410, and the bit $b_3$ controls the voltage of eight electrodes 410.

FIG. 6 illustrates an embodiment generally designated 505 in which four nominally identical electrodes 510.0, 510.1, 510.2, 510.3, collectively electrodes 510, are used to produce a phase shift within respective phase modulation sections 520.0, 520.1, 520.2, 520.3, collectively phase modulation sections 520. In the embodiment 500 the voltages applied to electrodes 510 are not equal. In the illustrated embodiment, the physical lengths of the phase modulation sections 520 are about equal, but embodiments are contemplated having unequal path lengths. The electrode 510.0 is controlled by a voltage $V_0$. The electrode 510.1 is controlled by a voltage $V_1$, which is about two times $V_0$. Similarly, the electrode 510.2 is controlled by a voltage $V_2$ that is about two times $V_1$, and the electrode 510.3 is controlled by a voltage $V_3$ that is about two times $V_2$. Thus configured, while the applied voltages remain in a linear response regime of the phase modulation sections 520 the sum of the phase shifts produced by the electrodes 510 and phase modulation sections 520 will generally be proportional to the value of a binary word that describes the pattern of energized electrodes 510.

Those skilled in the pertinent art will appreciate that by applying the described principles various combinations of control voltages, electrode sizes, and number of electrodes per control line may be used to produce a desired combination of phase shift values to produce any desired phase-form of the output optical signal 190 of a general AWOPG described by the AWOPG 105, within the constraints imposed by material choices, device geometry and number of control bits, for example.

Referring back to FIG. 1, phase-modulated optical carrier signal 190 from AWOPG 105, in the form of $E_c e^{j\omega_c t} e^{j\phi(t)}$, is combined by optical combiner 107 with optical carrier signal 195, in the form of $E_c e^{j\omega_c t}$, identical to that of optical carrier signal 180. Optical combiner 107 is a passive optical device which is conventional. The phase of optical carrier signal 195 may be adjusted by phase modulator 109, described below, which is active only during a calibration of AWG 100. With optical carrier signal 195, combiner 107 beats the phase-modulated signal 190 to yield optical waveform 122, in the form of $|E_c|^2 \sin \phi(t)$. Thus, by manipulating the control inputs to AWOPG 105, one can manipulate the phase shift $\phi(t)$ accordingly and thereby arbitrarily shape optical waveform 122 as a function of t.

Optical waveform 122 is detected by optical detector 124 which is conventional and which may be a differential balanced optical detector. In a well known manner, detector 124 converts optical waveform 122 to the corresponding electrical waveform 126, which has a radio frequency. The latter may be amplified by electrical amplifier 128 before it is provided at the output of AWG 100.

In one embodiment, the aforementioned modulator 109 is a low-frequency optical phase-modulator for making an accurate optical phase adjustment between optical carrier signal 195 and the phase-modulated signal 190 in case of uneven temperatures on the chip they are in. To that end, modulator 109 is activated during a calibration of AWG 100 which is performed from time to time. During one such calibration, a specific set of control signals 150 are introduced to AWOPG 105 which is supposed to produce a corresponding known voltage value, e.g., the maximum voltage value, or known series of voltage values at the output AWG 100. In one embodiment, the output of AWG 100 is fed back to comparator 129 which compares the actual AWG output value with the known maximum output value provided as input A to comparator 129. The output of comparator 129, representing a difference between the AWG output value and the known maximum output value, is fed to processor 131, which translates the difference to a regulating signal for application to phase modulator 109. In response to such a regulating signal, phase modulator 109 induces a corresponding phase shift on signal 195, causing elimination of the difference at the output of comparator 129 and thereby achieving calibration of AWG 100.

The foregoing merely illustrates the principles of the invention. It will thus be appreciated that those skilled in the art will be able to devise numerous arrangements which embody the principles of the invention and are thus within its spirit and scope.

For example, although AWG 100, as disclosed, is embodied in the form of various discrete functional blocks, such an AWG could equally well be embodied in an arrangement in which the functions of any one or more of those blocks or indeed, all of the functions thereof, are realized, for example, by one or more processors, devices or modules.

What is claimed is:

1. An apparatus, comprising:
 a phase-modulation device for phase-modulating a first optical carrier signal having a given phase, resulting in a phase-modulated optical signal whose phase differs from the first phase by a phase value which is controllable by one or more inputs to the device, the phase-modulation device comprising a plurality of electrodes configured to produce a plurality of discrete phase shifts on the first optical carrier signal based on the inputs, such that the phase value is based on a sum of the plurality of discrete phase shifts; and
 a combiner element for combining a second optical carrier signal having the given phase with the phase-modulated optical signal to provide a waveform whose amplitude varies with the phase value;
 wherein the phase-modulation device comprises a plurality of optical phase modulators arranged sequentially over an optical path configured to propagate the first optical carrier signal; and
 wherein at least one of the optical phase modulators comprise at least one of the electrodes.

2. The apparatus of claim 1 wherein the waveform is optical, further comprising an optical detector for converting the waveform to an electrical waveform.

3. The apparatus of claim 1 wherein a first of the plurality of electrodes is configured to produce a first phase shift and a second of the plurality of electrodes is configured to produce a second phase shift that is about twice said first phase shift.

4. The apparatus of claim 1 wherein the plurality of electrodes are configured such that the sum has a maximum value less than about $2\pi$ radians.

5. The apparatus of claim 1 wherein each of the electrodes is associated with a respective one of a plurality of portions of the optical path, each optical path portion having a different length.

6. The apparatus of claim 5 wherein each optical path portion has a length that is about twice as long as a path length of a next shorter optical path portion.

7. The apparatus of claim 1 wherein the plurality of electrodes include n electrodes configured to shift the first phase by any of $2^n$ different phase shift values.

8. The apparatus of claim 7 wherein an incremental phase shift between any two subsequent phase shift values is about $\pi/2^{n-1}$ radians.

\* \* \* \* \*